(12) United States Patent
Garcia Alvarez

(10) Patent No.: US 12,337,934 B2
(45) Date of Patent: Jun. 24, 2025

(54) ELECTRIC GENERATING BICYCLE ASSEMBLY

(71) Applicant: Salvador Garcia Alvarez, Torrance, CA (US)

(72) Inventor: Salvador Garcia Alvarez, Torrance, CA (US)

( * ) Notice: Subject to any disclaimer, the term of this patent is extended or adjusted under 35 U.S.C. 154(b) by 643 days.

(21) Appl. No.: 17/743,241

(22) Filed: May 12, 2022

(65) Prior Publication Data

US 2023/0365222 A1 Nov. 16, 2023

(51) Int. Cl.
*B62M 6/70* (2010.01)
*B62J 6/02* (2020.01)
*B62J 6/04* (2020.01)
*B62J 6/14* (2006.01)
*B62J 43/13* (2020.01)
*B62J 43/30* (2020.01)
*B62J 45/20* (2020.01)
*B62M 6/45* (2010.01)
*B62M 6/90* (2010.01)

(52) U.S. Cl.
CPC .............. *B62M 6/70* (2013.01); *B62J 43/13* (2020.02); *B62M 6/90* (2013.01); *B62J 6/02* (2013.01); *B62J 6/04* (2013.01)

(58) Field of Classification Search
CPC . B62M 6/40; B62M 6/45; B62M 6/70; B62M 6/75; B62M 6/90; B62J 6/02; B62J 6/028; B62J 6/03; B62J 6/04; B62J 6/06; B62J 6/08; B62J 6/14; B62J 45/20; B62J 43/00; B62J 43/13; B62J 43/30

USPC ......... 180/206.1, 206.7, 206.8, 207.1, 207.3, 180/220
See application file for complete search history.

(56) References Cited

U.S. PATENT DOCUMENTS

| | | | | |
|---|---|---|---|---|
| 2,488,021 A | | 11/1949 | May | |
| 3,921,741 A | * | 11/1975 | Garfinkle | B62M 6/45 180/206.6 |
| 5,222,752 A | * | 6/1993 | Hewitt | B62J 43/30 280/288.4 |
| 5,237,263 A | * | 8/1993 | Gannon | B62M 13/02 318/599 |
| 6,173,801 B1 | * | 1/2001 | Kakutani | B62M 6/40 180/220 |
| 8,925,668 B1 | * | 1/2015 | Mofield | B62M 6/60 180/206.1 |
| 9,061,731 B1 | * | 6/2015 | Do | B62M 6/85 |

(Continued)

FOREIGN PATENT DOCUMENTS

WO WO-2014193245 A1 * 12/2014 ............... B62J 1/08

*Primary Examiner* — Anne Marie M Boehler

(57) ABSTRACT

An electric generating bicycle assembly for recycling power from a generator includes a bicycle frame made of recyclable material. The bicycle frame has a pair of wheels. Furthermore, the bicycle frame has a pair of pedals. The pair of pedals is in mechanical communication with the pair of wheels. The pair of pedals rotates the pair of wheels wherein providing motion to the bicycle frame. A generator has a drive belt positioned around a back wheel of the pair of wheels. The generator produces electric current. A battery is in electric communication with the generator, and a panel is in electric communication with the battery. The panel has a universal serial bus port and a global positioning system chip. A motor is in electric communication with the battery. The motor is rotates the back wheel of the pair of wheels.

14 Claims, 6 Drawing Sheets

(56) References Cited

U.S. PATENT DOCUMENTS

| | | | |
|---|---|---|---|
| 9,278,727 B2 | 3/2016 | Anderson | |
| 10,926,835 B2* | 2/2021 | Bui | B62M 6/60 |
| 11,311,765 B2* | 4/2022 | Cragg | A63B 21/22 |
| 2009/0277699 A1* | 11/2009 | Wan | B60L 8/003 |
| | | | 180/2.2 |
| 2011/0001442 A1 | 1/2011 | Lee | |
| 2011/0304288 A1* | 12/2011 | Saida | B60L 1/14 |
| | | | 318/376 |
| 2012/0098232 A1* | 4/2012 | Calabresse Muzzi | B62K 19/06 |
| | | | 280/281.1 |
| 2012/0202649 A1 | 8/2012 | Huber | |
| 2014/0262568 A1* | 9/2014 | Matsuda | B62J 43/20 |
| | | | 180/65.1 |
| 2016/0244005 A1* | 8/2016 | Seagraves | H02J 7/00 |
| 2021/0039737 A1* | 2/2021 | Montez | H04M 1/72412 |
| 2021/0354772 A1* | 11/2021 | Askin | B62J 6/015 |
| 2022/0009587 A1* | 1/2022 | Macias | B62M 6/45 |

* cited by examiner

ELECTRIC GENERATING BICYCLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electric bicycle device and more particularly pertains to a new electric bicycle device for recycling power from a generator.

(2) Description of Related Art Including Information Disclosed Under 37 CFR 1.97 and 1.98

The prior art relates to electric bicycle devices. The prior art relates to a variety of electric bicycle devices having a generator and a battery assembly. Known prior art lacks an electric bicycle device made of recyclable material having a generator and a battery assembly and a panel comprising a universal serial bus port with a global positioning system chip.

BRIEF SUMMARY OF THE INVENTION

An embodiment of the disclosure meets the needs presented above by generally comprising a bicycle frame made of recyclable material. The bicycle frame is configured for having a pair of wheels. Furthermore, the bicycle frame has a pair of pedals. The pair of pedals is in mechanical communication with the pair of wheels. The pair of pedals is configured for rotating the pair of wheels wherein providing motion to the bicycle frame. A generator has a drive belt positioned around a back wheel of the pair of wheels. The generator is configured for producing electric current. A battery is in electric communication with the generator, and a panel is in electric communication with the battery. The panel has a universal serial bus port and a global positioning system chip. A motor is in electric communication with the battery. The motor is configured for rotating the back wheel of the pair of wheels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
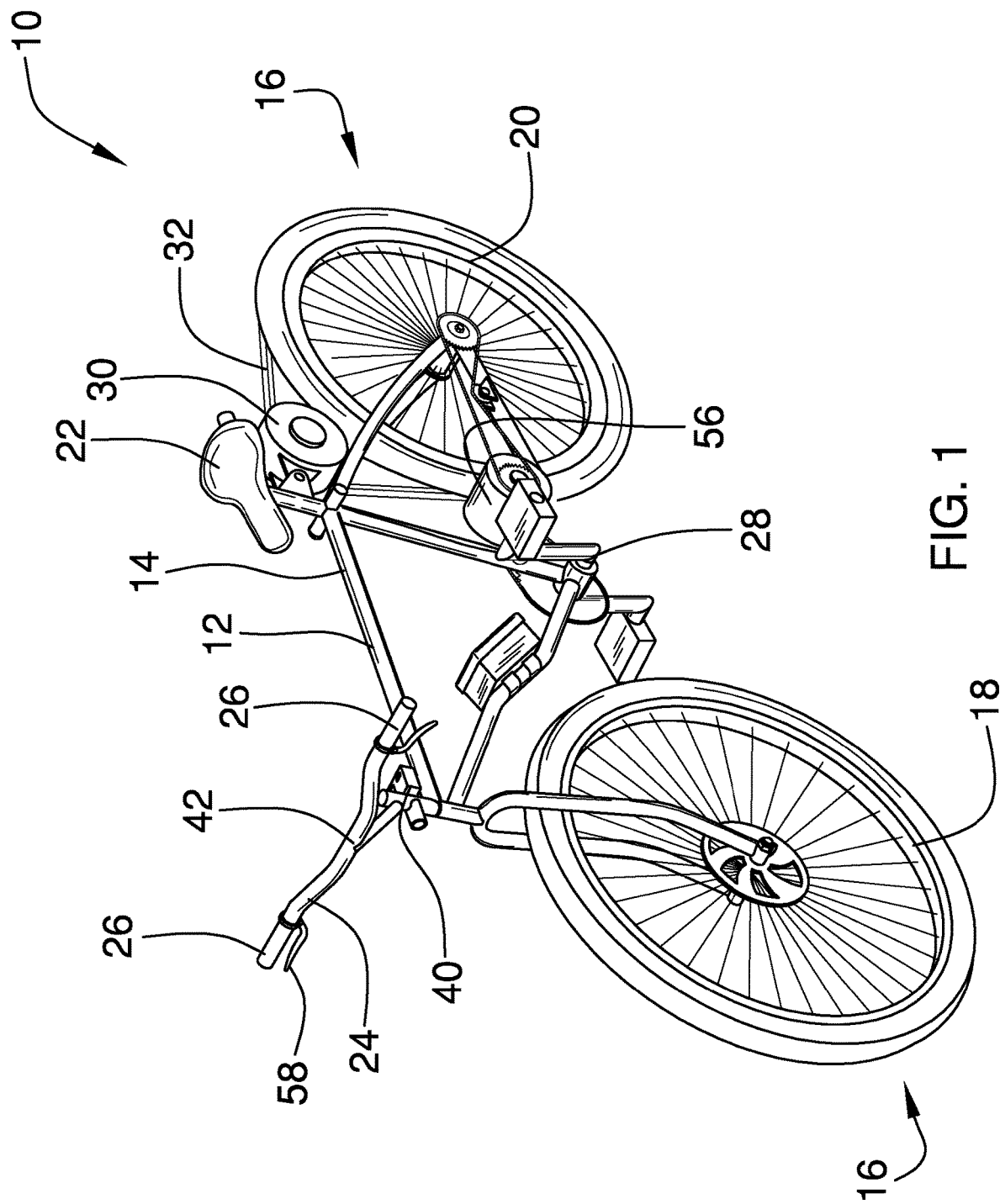
FIG. 1 is a front isometric view of an electric generating bicycle assembly according to an embodiment of the disclosure.
Figure 2:
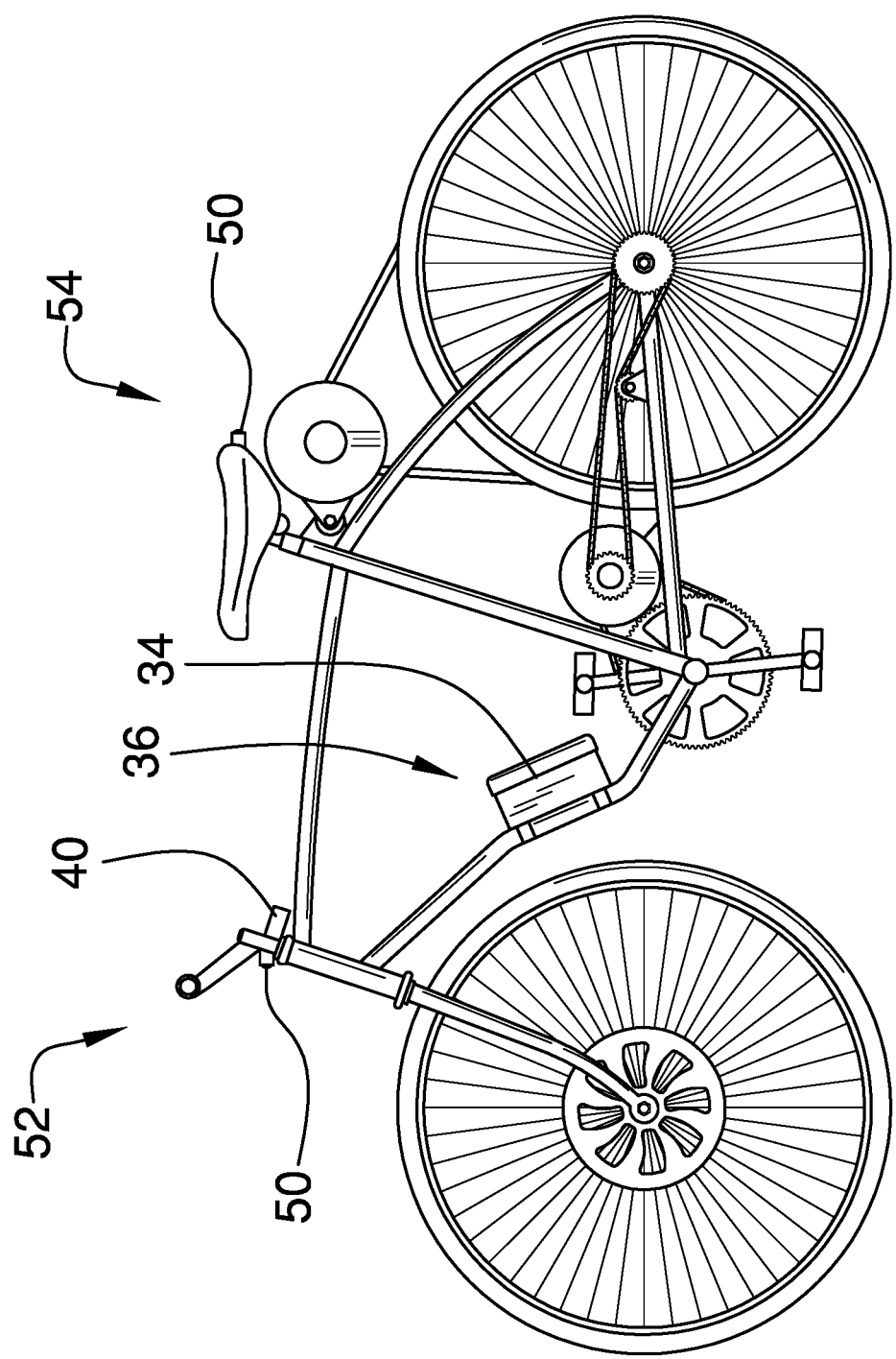
FIG. 2 is a front view of an embodiment of the disclosure.
Figure 3:
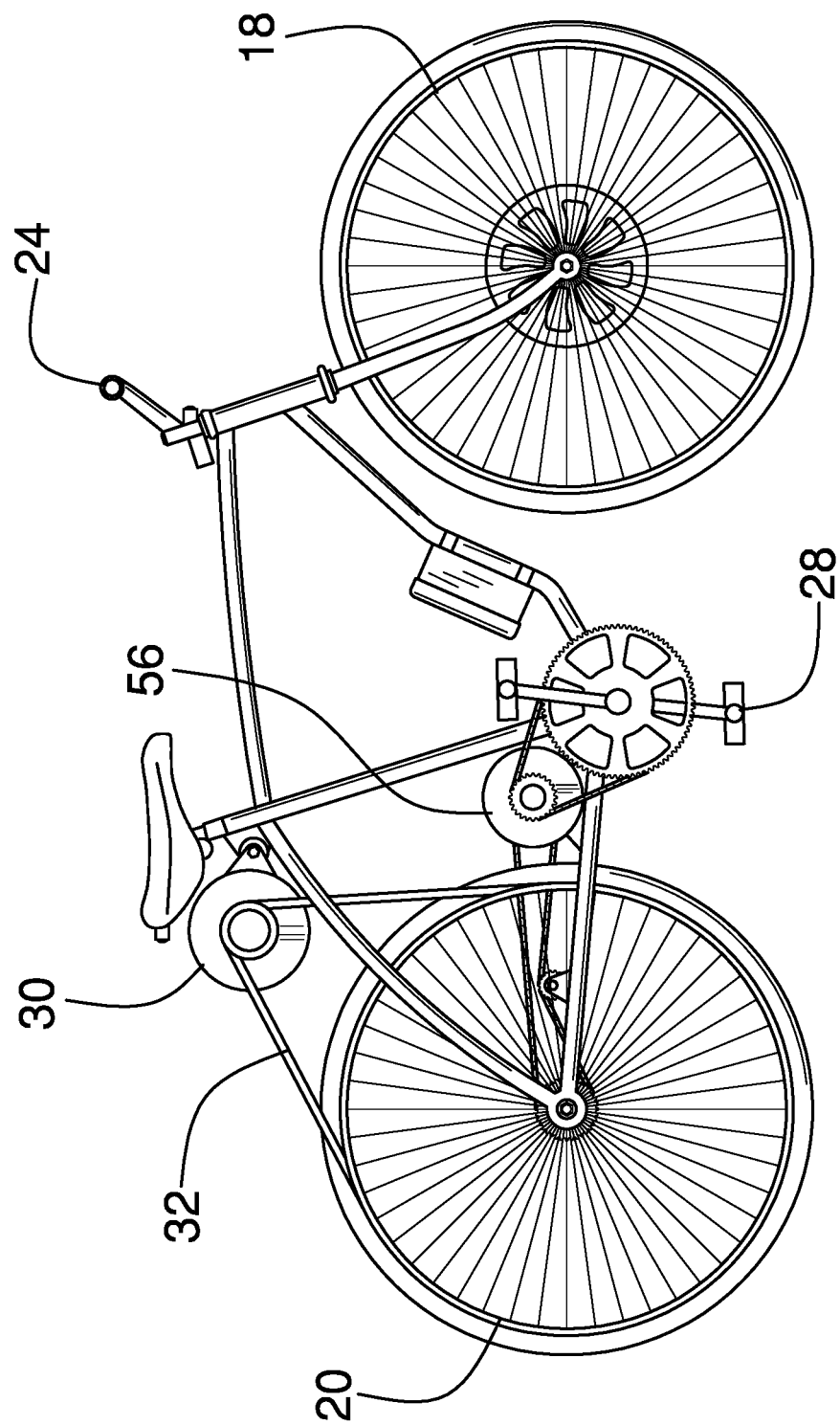
FIG. 3 is a rear view of an embodiment of the disclosure.
Figure 4:
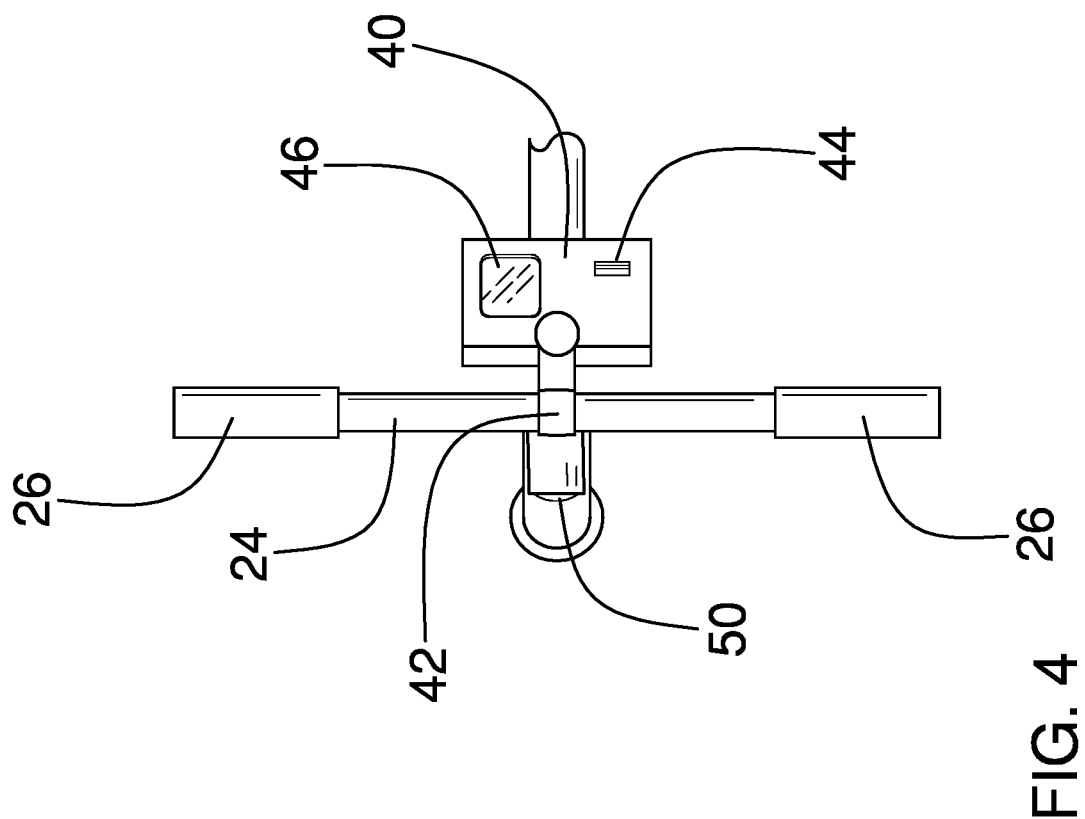
FIG. 4 is an enlarged partial top view of an embodiment of the disclosure.
Figure 5:
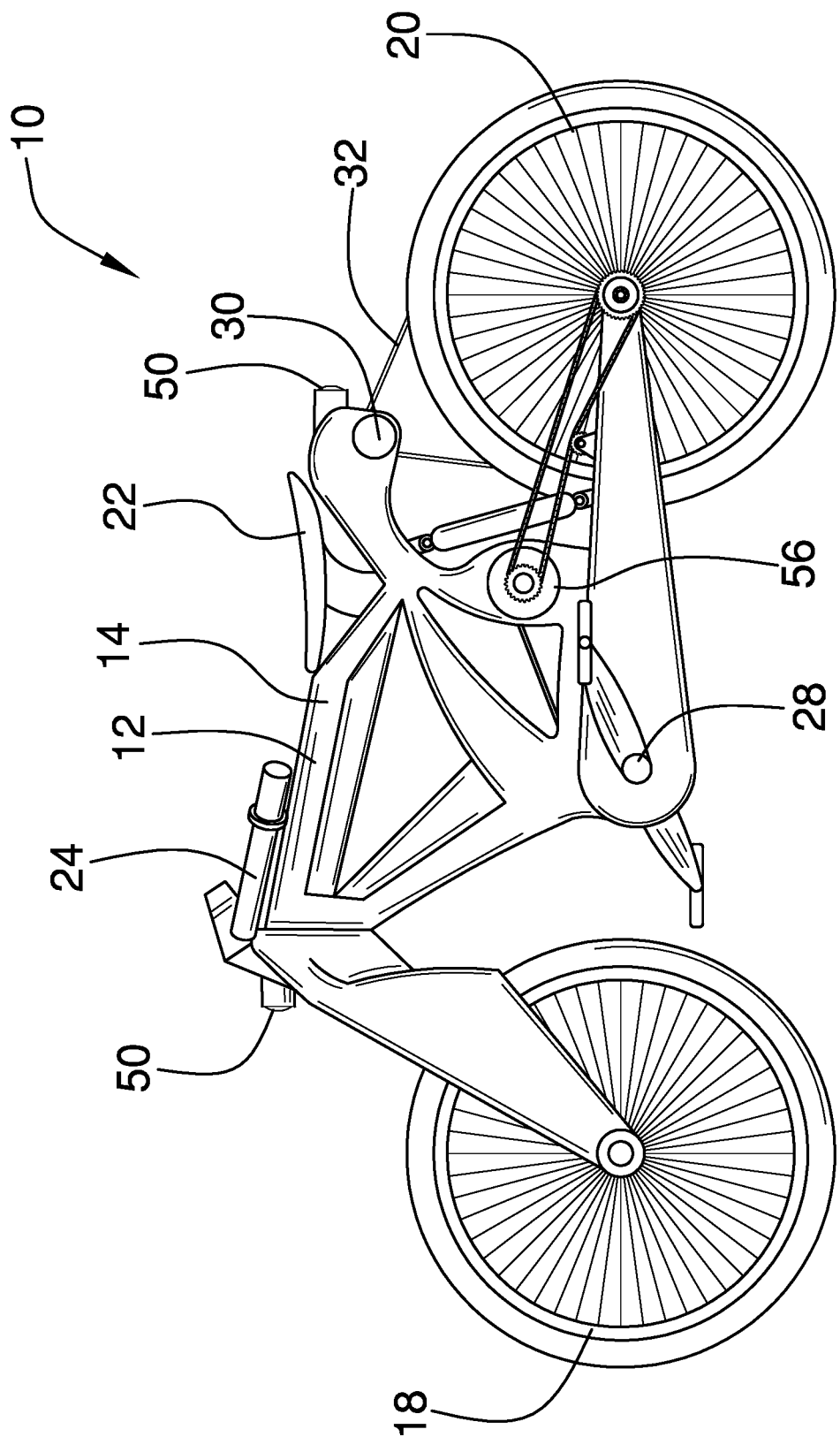
FIG. 5 is an alternative view of an embodiment of the disclosure.
Figure 6:
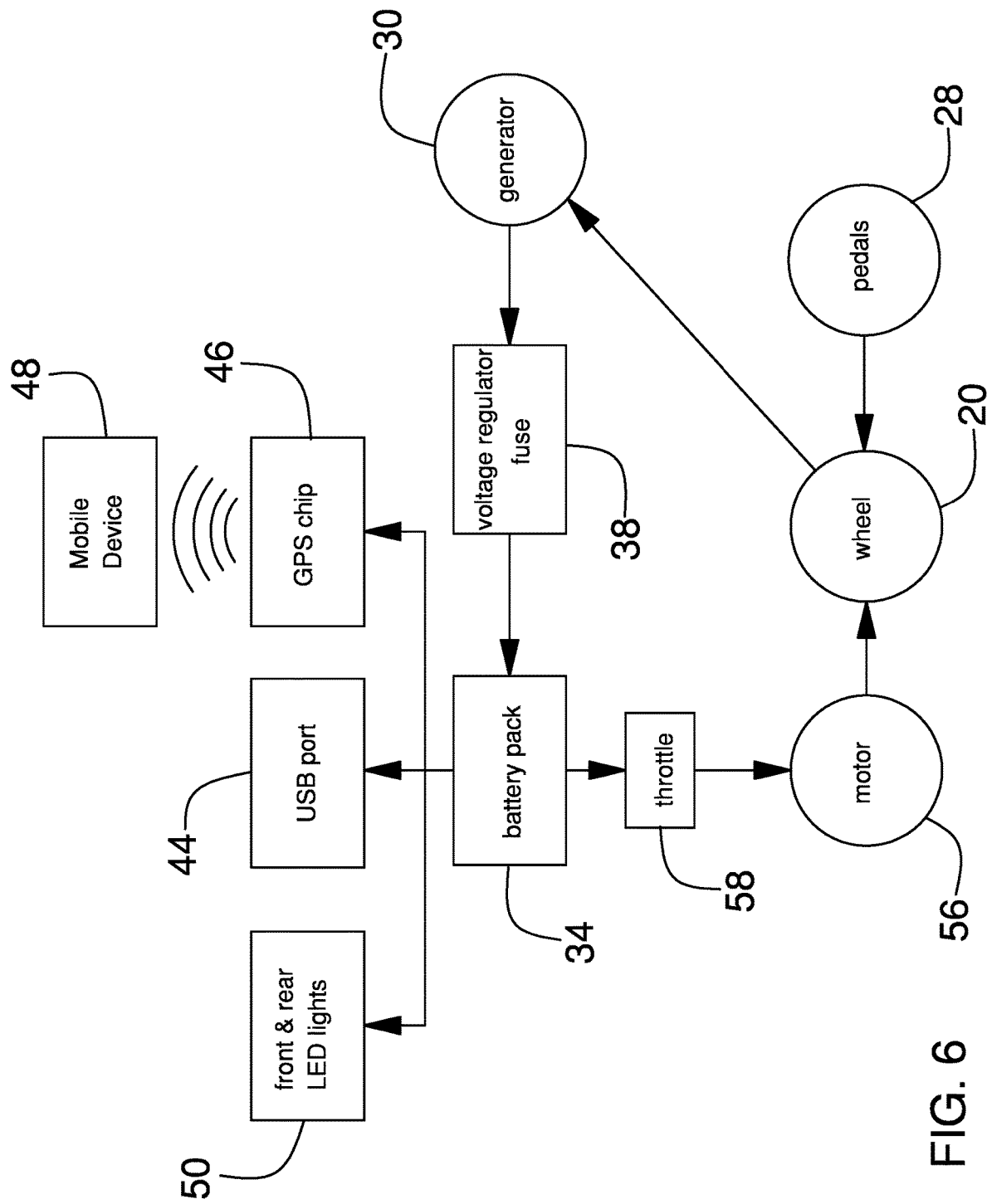
FIG. 6 is a block diagram view of an embodiment of the disclosure.

With reference now to the drawings, and in particular to FIGS. 1 through 6 thereof, a new electric bicycle device embodying the principles and concepts of an embodiment of the disclosure and generally designated by the reference numeral 10 will be described.

As best illustrated in FIGS. 1 through 6, the electric generating bicycle assembly 10 generally comprises a bicycle frame 12. The bicycle frame 12 is made of recyclable material 14. The recyclable material 14 is configured for being recycled water bottle plastic. The bicycle frame 12 includes a pair of wheels 16 comprising a front wheel 18 and a back wheel 20. Furthermore, the bicycle frame 12 has a seat 22 and a handlebar 24. The handlebar 24 has a pair of handles 26 positioned proximate to the front wheel 18 of the pair of wheels 16 of the bicycle frame 12. The bicycle frame 12 has a pair of pedals 28 positioned beneath the seat 22. The pair of pedals 28 is in mechanical communication with the pair of wheels 16 and is configured for rotating the pair of wheels 16, thus providing motion to the bicycle frame 12.

The bicycle frame 12 has a generator 30. The generator 30 has a drive belt 32 positioned around the back wheel 20 of the pair of wheels 16. The generator 30 is configured for producing electric current from the rotation of the drive belt 32. The drive belt 32 is configured for actuating the production of the electric current and the back wheel 20 assists in rotating the drive belt 32, thus producing electric current within the generator 30. The electric current produced by the generator 30 is used as voltage by a battery 34. The battery 34 is in electric communication with the generator 30 and receives power from the generator 30.

The battery 34 is positioned in a center 36 of a distance from the pair of pedals 28 to the handlebar 24. The battery 34 has a voltage regulator fuse 38 configured for restricting an overload of voltage provided to the battery 34 from the generator 30, thus preventing the battery 34 from malfunctioning. Furthermore, a panel 40 is in electric communication with the battery 34. The panel 40 is positioned in a center 42 of the handlebar 24. The panel 40 has a universal serial bus port 44 and a global positioning system chip 46. The global positioning system chip 46 is configured for being in wireless communication with a mobile device 48. The universal serial bus port 44 is configured for connecting to a universal serial bus input to charge a variety of items such as the mobile device 48.

A plurality of lights 50 is positioned on a front 52 of the bicycle frame 12 and a back 54 of the bicycle frame 12. Each of the lights 50 is a light emitting diode. The plurality of lights 50 is in electric communication with the battery 34 wherein the battery 34 provides power to each of the lights 50. The plurality of lights 50 is configured for emitting light when the bicycle frame 12 is in motion. Additionally, a motor 56 is in electric communication with the battery 34. The motor 56 is in mechanical communication with the back wheel 20 of the pair of wheels 16. The motor 56 has a throttle 58, and the motor 56 is configured for rotating the back wheel 20 when the user engages with the throttle 58. The throttle 58 is positioned on a handle of the pair of handles 26 of the handlebar 24.

In use, each of the feet of the user engages with each of the pedals 28 of the bicycle frame 12 by rotating the pair of pedals 28 forward relative to the bicycle frame 12. As each of the pedals 28 rotate, the pair of wheels 16 rotates, thus the back wheel 20 rotates the drive belt 32 of the generator 30. The rotation of the drive belt 32 within the generator 30 produces electric current, which is then used as voltage for the battery 34. The battery 34 can then provide power to the panel 40 of the bicycle frame 12, thus powering the global positioning system chip 46 and the universal serial bus port 44. Additionally, the battery 34 provides power to the plurality of lights 50 of the bicycle frame 12. A motor 56 can be used to provide motion to the bicycle frame 12 by engaging with a throttle 58 on the handlebar 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A power generating bicycle assembly configured for powering a battery of the bicycle, the assembly comprising:
   a bicycle frame being made of recyclable material, said bicycle frame being configured for having a pair of wheels, said bicycle frame having a pair of pedals, said pair of pedals being in mechanical communication with one of said pair of wheels, said pair of pedals being configured for rotating said pair of wheels wherein providing motion to said bicycle frame;
   a generator having a drive belt positioned around a back wheel of said pair of wheels, said generator being configured for producing electric current;
   a battery being in electric communication with said generator;
   a panel being in electric communication with said battery, said panel having a universal serial bus port and a global positioning system chip; and
   a motor being in electric communication with said battery, said motor being configured for rotating said back wheel of said pair of wheels.

2. The power generating bicycle assembly of claim 1, further comprising said bicycle frame having a seat.

3. The power generating bicycle assembly of claim 2, further comprising said bicycle frame having a handlebar, said handlebar having a pair of handles.

4. The power generating bicycle assembly of claim 1, further comprising said pair of pedals being configured for rotating said one of pair of wheels wherein providing motion to said bicycle frame.

5. The power generating bicycle assembly of claim 1, further comprising said drive belt being configured for actuating the production of electric current.

6. The power generating bicycle assembly of claim 5, further comprising said back wheel of said pair of wheels being configured for assisting in rotating said drive belt wherein producing electric current within said generator.

7. The power generating bicycle assembly of claim 1, further comprising said battery having a voltage regulator fuse, said voltage regulator fuse being configured to restrict an overload of voltage provided to said battery from said generator.

8. The power generating bicycle assembly of claim 1, further comprising said global positioning system chip being configured for being in wireless communication with a mobile device.

9. The power generating bicycle assembly of claim 3, further comprising said panel being positioned in a center of said handlebar of said bicycle frame.

10. The power generating bicycle assembly of claim 1, further comprising a plurality of lights being in electric communication with said battery, each of said lights being a light emitting diode.

11. The power generating bicycle assembly of claim 10, further comprising said plurality of lights being positioned on a front of said bicycle frame and a back of said bicycle frame, said plurality of lights being configured for emitting light when said bicycle frame being in motion.

12. The power generating bicycle assembly of claim 1, further comprising said motor being in mechanical communication with said back wheel of said pair of wheels.

13. The power generating bicycle assembly of claim 3, further comprising said motor having a throttle, said throttle being an actuator for said motor, said throttle being positioned on a handle of said pair of handles of said handlebar.

14. A power generating bicycle assembly configured for powering a battery of the bicycle, the assembly comprising:

a bicycle frame being made of recyclable material, said bicycle frame being configured for having a pair of wheels, said bicycle frame having a seat, said bicycle frame having a handlebar, said handlebar having a pair of handles, said bicycle frame having a pair of pedals, said pair of pedals being in mechanical communication with one of said pair of wheels, said pair of pedals being configured for rotating said one of said pair of wheels wherein providing motion to said bicycle frame;

a generator having a drive belt positioned around a back wheel of said pair of wheels, said generator being configured for producing electric current, said drive belt being configured for actuating the production of electric current, said back wheel of said pair of wheels being configured for assisting in rotating said drive belt wherein producing electric current within said generator;

a battery being in electric communication with said generator, said battery having a voltage regulator fuse, said voltage regulator fuse being configured to restrict an overload of voltage provided to said battery from said generator;

a panel being in electric communication with said battery, said panel having a universal serial bus port and a global positioning system chip, said global positioning system chip being configured for being in wireless communication with a mobile device, said panel being positioned in a center of said handlebar of said bicycle frame;

a plurality of lights being in electric communication with said battery, each of said lights being a light emitting diode, said plurality of lights being positioned on a front of said bicycle frame and a back of said bicycle frame, said plurality of lights being configured for emitting light when said bicycle frame being in motion; and a motor being in electric communication with said battery, said motor being in mechanical communication with said back wheel of said pair of wheels, said motor being configured for rotating said back wheel of said pair of wheels, said motor having a throttle, said throttle being an actuator for said motor, said throttle being positioned on a handle of said pair of handles of said handlebar.

\* \* \* \* \*